Patented May 9, 1933

1,908,304

UNITED STATES PATENT OFFICE

LOUIS BENDA, OF FRANKFORT-ON-THE-MAIN-FECHENHEIM, GERMANY, ASSIGNOR TO WINTHROP CHEMICAL COMPANY, INC., OF NEW YORK, N. Y., A CORPORATION OF NEW YORK

DI-SODIUM SALT OF ACYLAMINO-PHENOL-ARSONIC ACIDS

No Drawing. Application filed September 23, 1929, Serial No. 394,748, and in Germany October 9, 1928.

My present invention relates to disodium salt of acylamino-phenol-arsonic acids.

The high solubility of these salts permits their employment for injection purposes. The sodium salts of 4-hydroxy-3-acetamino-benzene-arsonic acid and this acid itself, which is known to be used per os, are not suitable for injections because of their small solubility. The potassium and lithium salts of this acid though being somewhat more soluble are very poisonous and therefore useless for therapeutic purposes (see U. S. Patent No. 1,532,361). Furthermore salts of this acid with ammonia and organic amines, for instance, diethyl-amine and hydroxyethyl-diethylamine, were proposed for the said purpose (see U. S. Patent No. 1,677,964). But without any doubt sodium salts are generally preferred for therapeutic and especially injection purposes. For these reasons the products of my present invention are of particular value.

They are obtained according to my process in a simple and cheap manner by dissolving in at least double the equivalent amount of an aqueous caustic soda or sodium carbonate solution a 4-hydroxy-3-acylamino-benzene arsonic acid of the formula:

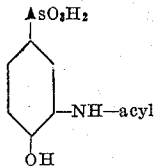

which may be further substituted, and by precipitating this solution by agents which are soluble in water, but do not dissolve the sodium salt. Such agents are, for instance, alcohol, acetone or common salt solution.

The new sodium salts thus obtained correspond probably to the general formula:

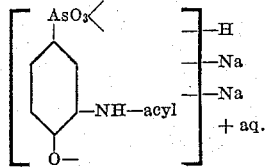

wherein the benzene radical may contain further substituents. They dissolve in only double to three times their weight of cold water and are well suited for injection purposes.

In order to further illustrate my invention the following examples are given, the parts being by weight; but I wish it to be understood that my invention is not limited to the examples given, nor to the exact conditions stated therein.

*Example 1*

275 parts of 4-hydroxy-3-acetamino-benzene-arsonic acid are dissolved at room temperature in 1080 parts of a caustic soda solution containing 80 parts of NaOH. The solution is filtered and then mixed with 4060 parts of alcohol of 94% strength. The new compound precipitates as a pulp of crystals. It is filtered off, washed with alcohol and dried. It corresponds probably to the formula:

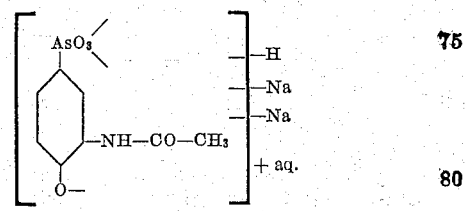

It represents fine white needles, soluble in double their quantity of cold water, very difficultly soluble in strong alcohol and acetone, insoluble in ether. It may be recrystallized from hot dilute alcohol. Its aqueous solution yields when acidified a crystallized precipitate of the free acid.

The same disodium salt is obtained by precipitating the solution with acetone or a common salt solution instead of alcohol.

If the 4-hydroxy-3-acetamino-benzene arsonic acid is replaced by other corresponding acylamino compounds, similar compounds of a good solubility are produced.

*Example 2*

345 parts of 4-hydroxy-5-chloro-3-acetamino-benzene arsonic acid of the formula:

$C_6H_2$—OH—Cl—$NHCOCH_3$—$AsO_3H_2 + 2H_2O$ which is described in Example 1 of U. S. patent No. 1,588,382, are dissolved at 60° C. in 1210 parts of a soda solution containing 117 parts of $Na_2CO_3$. The filtered solution is precipitated at room temperature with 5280 parts of alcohol of 94% strength. The precipitate is isolated as described in Example 1. The new sodium salt corresponds probably to the formula:

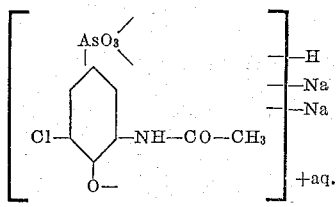

It represents colorless needles soluble in double their quantity of water, showing similar properties as the product of Example 1.

*Example 3*

337 parts of 4-hydroxy-3-benzoylamino-benzene-arsonic acid are dissolved in 250 parts of water and 265 parts of a caustic soda solution containing 80 parts of NaOH. This solution is allowed to run into 2000 parts of spirit while stirring. After standing and cooling for ¼ of an hour, the new disodium salt is filtered off and washed with alcohol and ether. It corresponds probably to the formula:

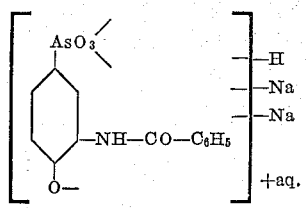

It is a white crystallized substance soluble in double its quantity of cold water, difficultly soluble in alcohol, insoluble in ether.

I claim:—

1. The disodium salt of 4-hydroxy-3-acetylamino-benzene arsonic acid of the probable formula:

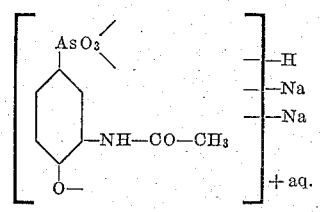

which product represents fine white needles, soluble in double its weight of cold water, very difficultly soluble in strong alcohol and acetone and insoluble in ether.

2. The disodium salts of hydroxy-acyl-amino-aryl-arsonic acids of the probable general formula:

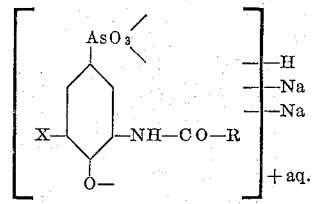

wherein X means hydrogen or chlorine and R means methyl or phenyl, which products are crystalline substances, soluble in threefold their weight of water, very difficultly soluble in strong alcohol, acetone and common salt solution and insoluble in ether.

3. The disodium salt of 4-hydroxy-3-benzoyl-amino-benzene-arsonic acid of the probable general formula:

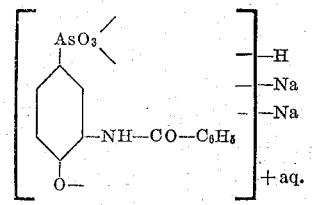

which product represents a white crystallized substance soluble in double its quantity of cold water, difficultly soluble in alcohol and insoluble in ether.

In testimony whereof, I affix my signature.

LOUIS BENDA.